United States Patent
Krause et al.

(10) Patent No.: US 9,687,764 B2
(45) Date of Patent: Jun. 27, 2017

(54) FILTER WITH AUDIBLE NOTIFICATION FEATURES

(71) Applicant: General Electric Company, Schenectady, NY (US)

(72) Inventors: Andrew Reinhard Krause, La Grange, KY (US); Gregory Sergeevich Chernov, Louisville, KY (US); Natarajan Venkatakrishnan, Louisville, KY (US); Kevin Farrelly Nolan, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 978 days.

(21) Appl. No.: 13/721,198

(22) Filed: Dec. 20, 2012

(65) Prior Publication Data

US 2014/0174996 A1    Jun. 26, 2014

(51) Int. Cl.
*B01D 35/14* (2006.01)
*B01D 35/143* (2006.01)

(52) U.S. Cl.
CPC .......... *B01D 35/14* (2013.01); *B01D 35/1435* (2013.01)

(58) Field of Classification Search
None
See application file for complete search history.

(56) References Cited

U.S. PATENT DOCUMENTS

| 5,753,107 | A | 5/1998 | Magnusson et al. |
| 6,027,644 | A | 2/2000 | Magnusson et al. |
| D433,094 | S | 10/2000 | Magnusson et al. |
| 6,193,884 | B1 | 2/2001 | Magnusson et al. |
| D455,814 | S | 4/2002 | Magnusson et al. |
| 7,396,461 | B2 | 7/2008 | Bommi et al. |
| 8,025,802 | B2 | 9/2011 | Walde et al. |
| 2006/0124532 | A1* | 6/2006 | Magnusson .......... B01D 35/153 210/420 |
| 2012/0261325 | A1* | 10/2012 | Brown ................. B01D 35/306 210/236 |

OTHER PUBLICATIONS

PUR Water Filter Owners Manual, at least as of Dec. 20, 2012.

* cited by examiner

*Primary Examiner* — Robert Clemente
*Assistant Examiner* — Akash Varma
(74) *Attorney, Agent, or Firm* — Dority & Manning, P.A.

(57) ABSTRACT

Audible features are provided for a fluid filter assembly and a filter cartridge for use with a fluid filter assembly. The audible features generate sound when the filter cartridge is installed in the filter system so as to provide a signal indicating proper installation. Sound can also be created when the filter cartridge is removed. The filter system can also be provided with features for reducing clogging of the fluid path leading to the filter element.

19 Claims, 12 Drawing Sheets

FILTER WITH AUDIBLE NOTIFICATION FEATURES

FIELD OF THE INVENTION

The subject matter of the present disclosure relates generally to a fluid filter assembly and/or filter provided with audible notification features.

BACKGROUND OF THE INVENTION

Fluid filter systems, particularly as used for water filtration, typically include a filter constructed with a media that removes unwanted particulates and other substances from the fluid. Filtration can be based on size exclusion, adsorption, and other mechanisms. Such filter systems can be provided as e.g., stand-alone systems or provided as part of an appliance, such as a refrigerator.

After a period of use, the filter must eventually be replaced. For example, the filter may become loaded with captured particulates, may expire, or may otherwise require replacement. Accordingly, filter systems frequently provide for replacement of the filter. As a matter of convenience to the user, filter systems may also be constructed in a manner intended to ease replacement by the user as opposed to requiring service by e.g., the original manufacturer or a trained installer.

One problem that can occur during filter replacement is improper sealing and/or seating of the new filter in the filter system. For example, the filter may not be aligned properly and/or may not be installed with the proper torque or force. As a result, a fluid leak may occur after replacing the filter. Depending upon the severity, such leaks may not be discovered at the time of installation. Accordingly, a filter system and/or filter cartridge with features that can notify the user of proper alignment and installation would be useful. More particularly, a filter system and/or filter cartridge that can create audible signals to notify the user of proper alignment and installation would be beneficial.

Another problem with conventional filter systems relates to clogging of the fluid path leading to the filter element or filter media. For example, filter systems can include a fluid pathway having a port or channel that provides unfiltered fluid to the filter element. This fluid pathway can become clogged with sediment or other particulates that block or limit the flow of fluid to the filter. Thus, a filter system that can be provided with one or more features for eliminating or reducing such blocking or clogging would be useful.

BRIEF DESCRIPTION OF THE INVENTION

The present invention provides audible features for both a fluid filter assembly and a filter cartridge for use with a fluid filter assembly. The audible features generate sound when the filter cartridge is installed in the filter system so as to provide a signal indicating proper installation. Sound can also be created when the filter cartridge is removed. The filter system can also be provided with features for reducing clogging of the fluid path leading to the filter element. Additional aspects and advantages of the invention will be set forth in part in the following description, or may be apparent from the description, or may be learned through practice of the invention.

In one exemplary embodiment, the present invention provides a fluid filter assembly. The assembly includes a filter manifold having a filter manifold body; a fluid inlet and a fluid outlet adapted for coupling the filter manifold to a fluid supply system; a fluid return port in fluid connection with the fluid outlet; a plurality of teeth positioned proximate to the fluid return port; and a fluid delivery port positioned proximate to the fluid return port, the fluid delivery port in fluid connection with the fluid inlet.

This exemplary embodiment also includes a filter cartridge removably attached with the filter manifold. The filter cartridge includes a filter housing; a filter element received into the filter housing; a filter outlet for the flow of fluid from the filter element out of the filter housing and into the fluid return port; a filter inlet positioned proximate to the filter outlet and in fluid connection with the fluid delivery port of the filter manifold; and at least one actuator positioned adjacent to the filter outlet and extending into contact with the plurality of teeth during installation of the filter cartridge onto the filter manifold, the actuator configured for providing an audible signal as the filter cartridge is installed.

In another exemplary embodiment, the present invention includes a refrigerator appliance having such fluid filter assembly.

In still another exemplary embodiment, the present invention provides a filter cartridge for a filter system. The filter cartridge includes a filter element; a filter housing defining a chamber into which the filter element is received, the filter housing having a filter outlet and a filter inlet in fluid communication with the chamber and configured so that fluid may pass through the filter element; and at least one actuator positioned adjacent to the filter outlet. The actuator extends longitudinally away from the filter element and is configured to provide an audible signal as the filter cartridge is installed into the filter system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
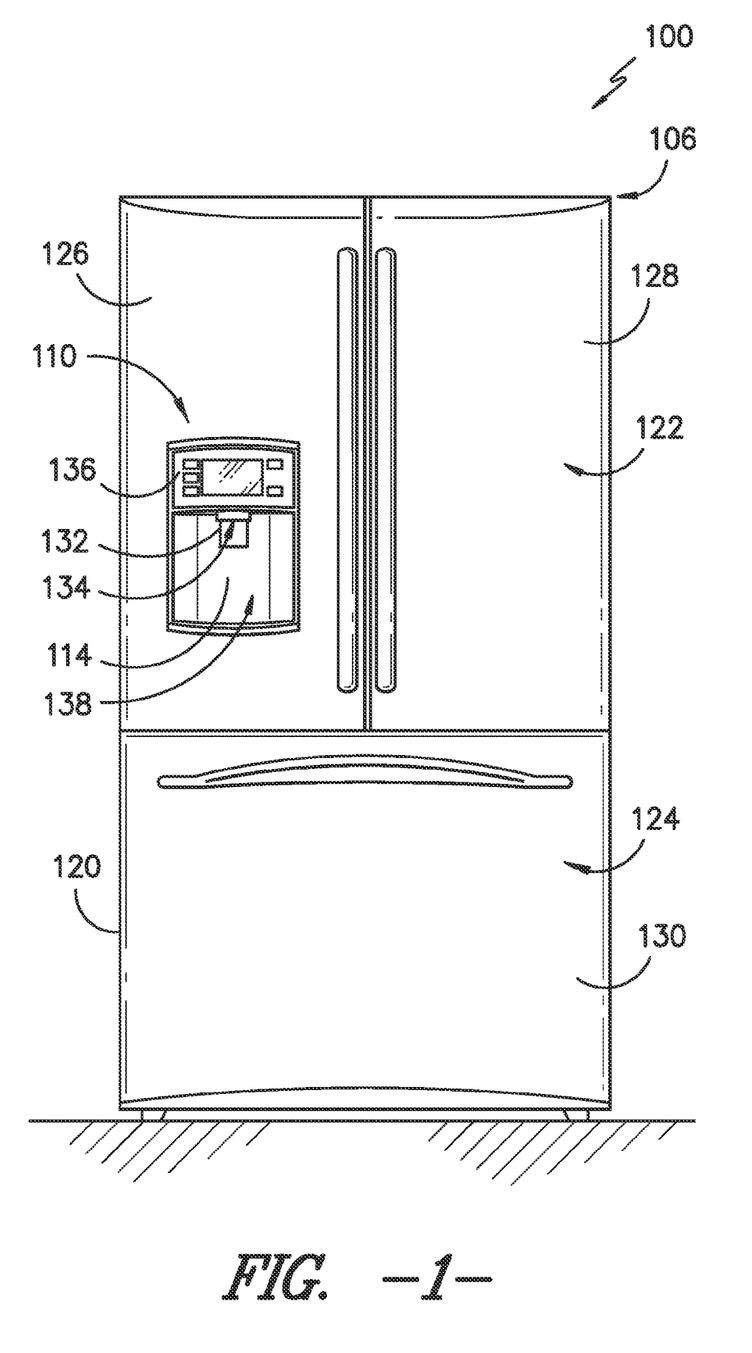
FIG. 1 provides a front view of an exemplary refrigerator appliance as may be equipped with a fluid filter assembly of the present invention.

FIG. 1 is a front view of an exemplary embodiment of a refrigerator appliance 100 as may be equipped with an exemplary fluid filter assembly of the present invention. However, as will be understood using the teachings disclosed herein, the fluid filter assembly (including the filter cartridge) of the present invention may be used with other refrigerator appliance configurations as well as other types of appliances, and it may also be used in applications other than appliances as well. As such, refrigerator appliance 100 is provided by way of example only.

Refrigerator appliance 100 includes a cabinet or housing 120 defining an upper fresh food chamber 122 and a lower freezer chamber 124 arranged below the fresh food chamber 122. As such, refrigerator appliance 100 is generally referred to as a bottom mount refrigerator. In this exemplary embodiment, housing 120 also defines a mechanical compartment (not shown) for receipt of a sealed cooling system. Using the teachings disclosed herein, one of skill in the art will understand that the present invention can be used with other types of refrigerators (e.g., side-by-sides).

Refrigerator doors 126, 128 are rotatably hinged to an edge of housing 120 for accessing fresh food chamber 122. A freezer door 130 is arranged below refrigerator doors 126, 128 for accessing freezer chamber 124. In the exemplary embodiment, freezer door 130 is coupled to a freezer drawer (not shown) that is slidably mounted within freezer chamber 124.

Refrigerator appliance 100 includes a dispensing assembly 110 for dispensing water and/or ice. Dispensing assembly 110 includes a dispenser 114 positioned on an exterior portion of refrigerator appliance 100. Dispenser 114 includes a discharging outlet 134 for accessing ice and water. An activation member 132 is mounted below discharging outlet 134 for operating dispenser 114. In FIG. 1, activation member 132 is shown as a paddle. However, activation member 132 may be any other suitable mechanism for signaling or initiating a flow of ice and/or water into a container within dispenser 114, e.g., a switch or button. A user interface panel 136 is provided for controlling the mode of operation. For example, user interface panel 136 includes a water dispensing button (not labeled) and an ice-dispensing button (not labeled) for selecting a desired mode of operation such as crushed or non-crushed ice.

Discharging outlet 134 and activation member 132 are an external part of dispenser 114, and are mounted in a recessed portion 138 defined in an outside surface of refrigerator door 126. Recessed portion 138 is positioned at a predetermined elevation convenient for a user to access ice or water and enabling the user to access ice without the need to bend-over and without the need to access fresh food chamber 122. In the exemplary embodiment, recessed portion 138 is positioned at a level that approximates the chest level of a user.

Figure 2:
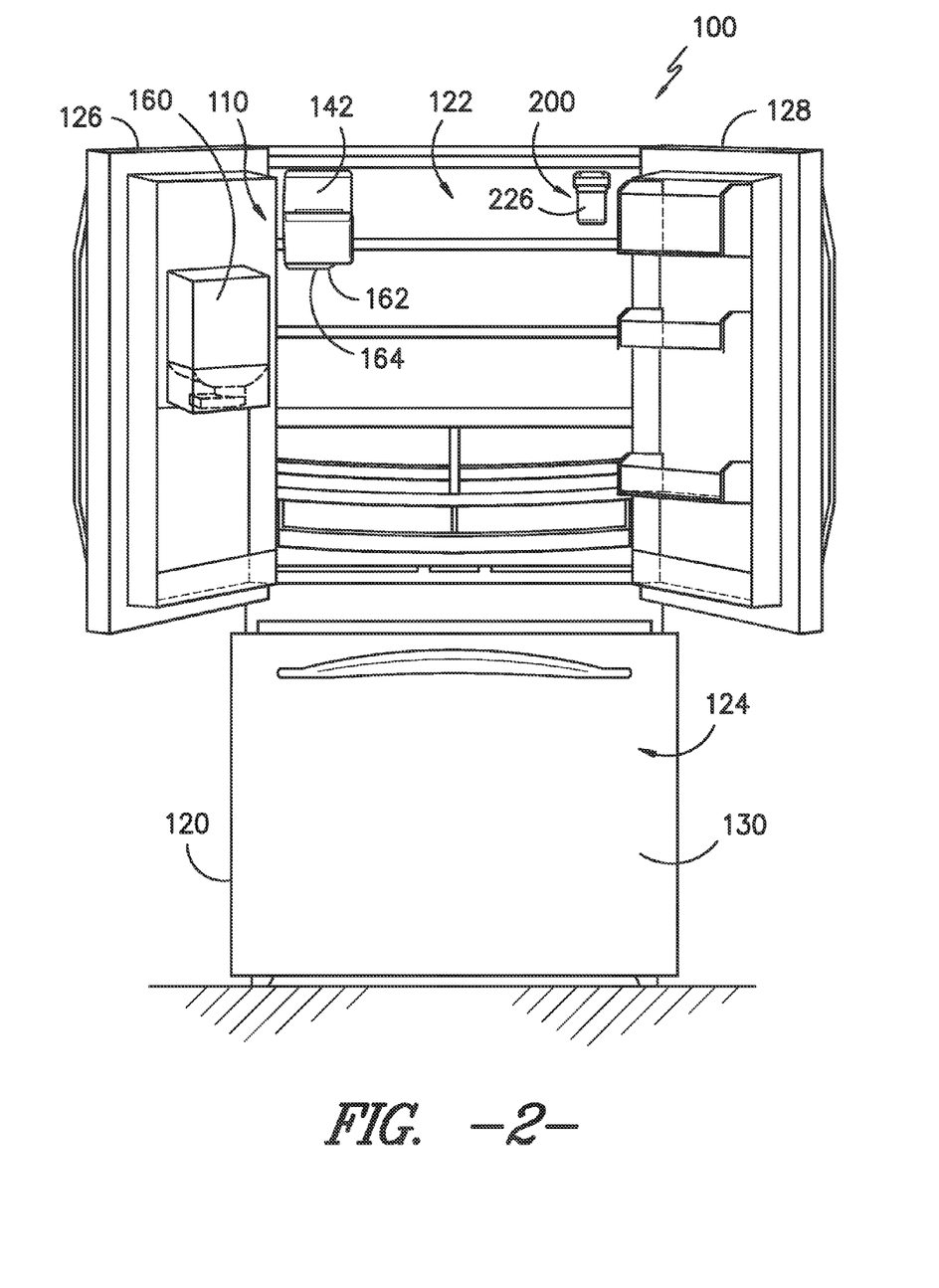
FIG. 2 provides a front view of the refrigerator appliance of FIG. 1 with refrigerator doors in an open position.

FIG. 2 is a perspective view of refrigerator appliance 100 having refrigerator doors 126, 128 in an open position to reveal the interior of the fresh food chamber 122. As such, certain components of dispensing assembly 110 are illustrated. Dispensing assembly 110 includes an insulated housing 142 mounted within chamber 122. Due to insulation surrounding insulated housing 142, the temperature within insulated housing 142 can be maintained at levels different from the ambient temperature in the surrounding fresh food chamber 122.

In particular, insulated housing 142 is constructed and arranged to operate at a temperature that facilitates producing and storing ice. Insulated housing 142 contains an ice maker (not shown) for creating ice and feeding the same to a receptacle 160 that is mounted on refrigerator door 126. As illustrated in FIG. 2, receptacle 160 is placed at a vertical position on refrigerator door 126 that will allow for the receipt of ice from a discharge opening 162 located along a bottom edge 164 of insulated housing 142 when refrigerator door 126 is in a closed position (shown in FIG. 1). As refrigerator door 126 is closed or opened, receptacle 160 is moved in and out of position under insulated housing 142.

Operation of the refrigerator appliance 100 is regulated by a controller (not shown) that is operatively coupled to user interface panel 136 and/or activation member 132 (shown in FIG. 1). User interface panel 136 provides selections for user manipulation of the operation of refrigerator appliance 100 such as e.g., selections between whole or crushed ice, chilled water, and/or other options as well. In response to user manipulation of the user interface panel 136, the controller operates various components of the refrigerator appliance 100. The controller may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor.

The controller may be positioned in a variety of locations throughout refrigerator appliance 100. For example, the controller may be located within beneath the user interface panel 136 on refrigerator door 126. In such an embodiment, input/output ("I/O") signals may be routed between the controller and various operational components of refrigerator appliance 100. In one exemplary embodiment, the user interface panel 136 may represent a general purpose I/O ("GPIO") device or functional block. In another exemplary embodiment, the user interface 136 may include input components, such as one or more of a variety of electrical, mechanical or electro-mechanical input devices including rotary dials, push buttons, and touch pads. The user interface panel 136 may be in communication with the controller via one or more signal lines or shared communication busses.

Refrigerator appliance 100 also includes a filter system or fluid filter assembly 200 that filters water coming into refrigerator appliance 100 from a water supply (not shown), such as a municipal water source or a well. Fluid filter assembly 200 can remove contaminants, such as chlorine, chloroform, lead, arsenic, pharmaceuticals, microbes, and/or other undesirable substances, from water supplied to refrigerator appliance 100. In particular, fluid filter assembly 200 can supply filtered water to the ice maker within insulated housing 142 and/or discharging outlet 134. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

For this exemplary embodiment, filter assembly 200 is shown positioned within fresh food chamber 122. However, filter assembly 200 may also be located e.g., on the exterior of refrigerator 100, on a surface adjacent to refrigerator 100, connected into a water supply line (not shown) providing fluid to refrigerator 100, and other locations as well.

Referring now to FIGS. 3 through 7, this exemplary embodiment of fluid filter assembly 200 includes a filter manifold 202 having a filter manifold body 204. A fluid inlet 206 and fluid outlet 208 are provided for a flow of unfiltered fluid into filter assembly 200 (arrow I) and a flow of filtered fluid out of filter assembly 200 (arrow O), respectively. Fluid inlet 206 and fluid outlet 208 are adapted for coupling filter manifold 202 to a fluid supply system such as e.g., the piping system within a user's dwelling that may be connected with a well or municipal water supply. By way of example, fluid inlet 206 and fluid outlet 208 may be equipped with slip fittings, threads, fasteners, and/or other mechanisms for attachment. Apertures 210 allow for connection of filter assembly 200 to a wall, cabinet, or other surface. Other methods of attachment may also be used.

Figure 5:
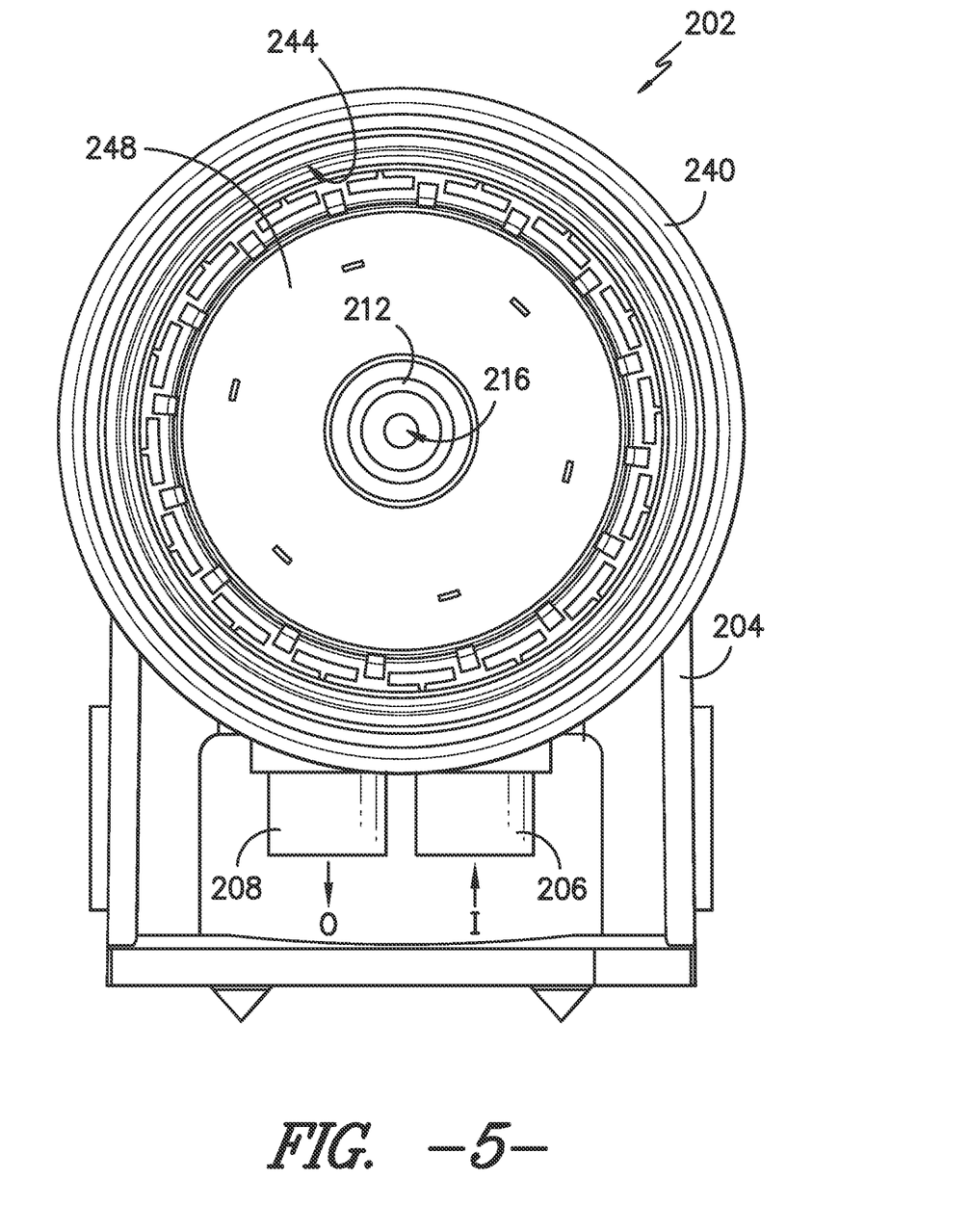
FIG. 5 is a bottom view of the exemplary fluid filter assembly of FIG. 3 with a portion of a filter housing removed to more clearly reveal certain internal components.
Figure 6:
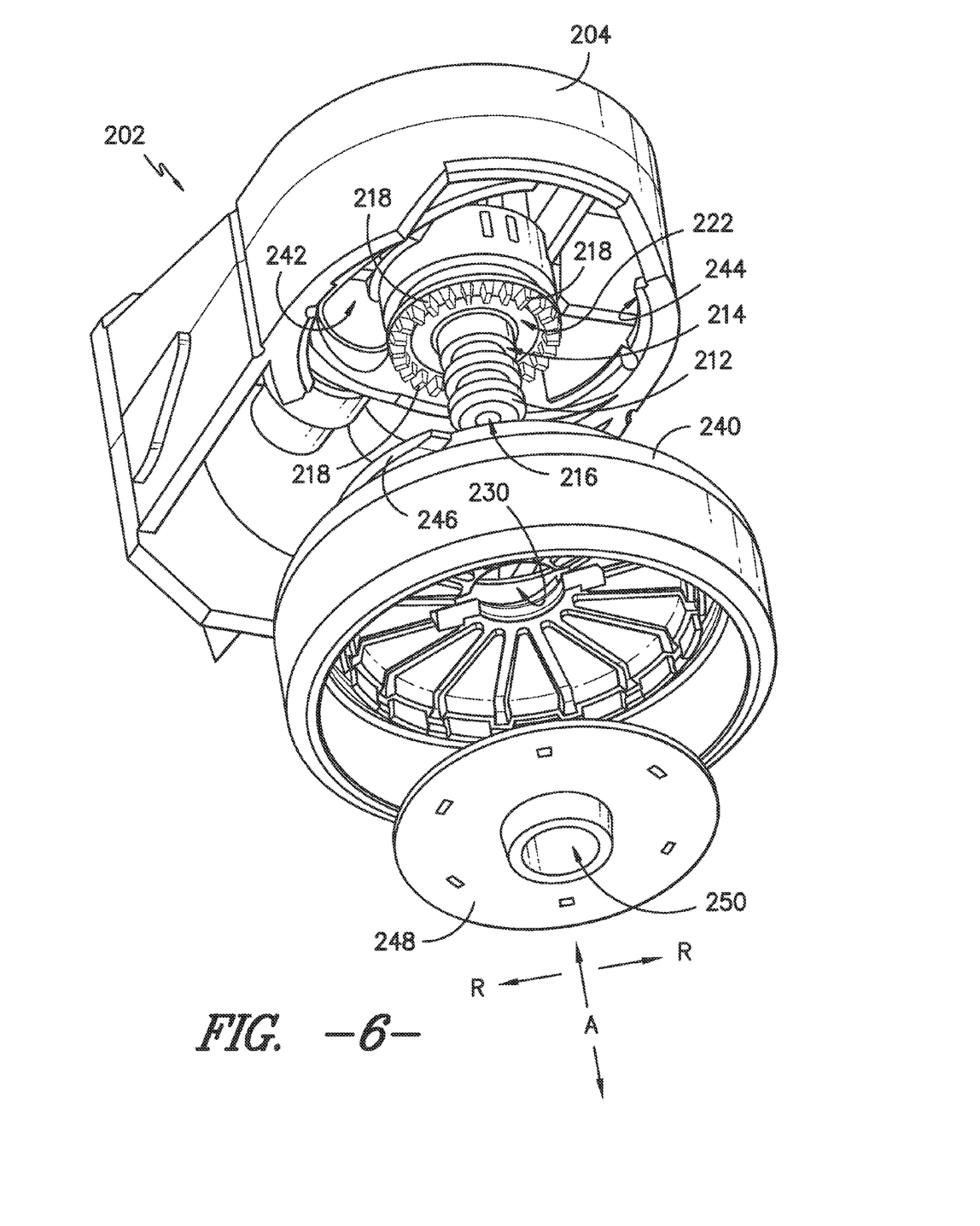
FIG. 6 provides an exploded and perspective view the exemplary fluid filter assembly of FIG. 5.
Figure 7:
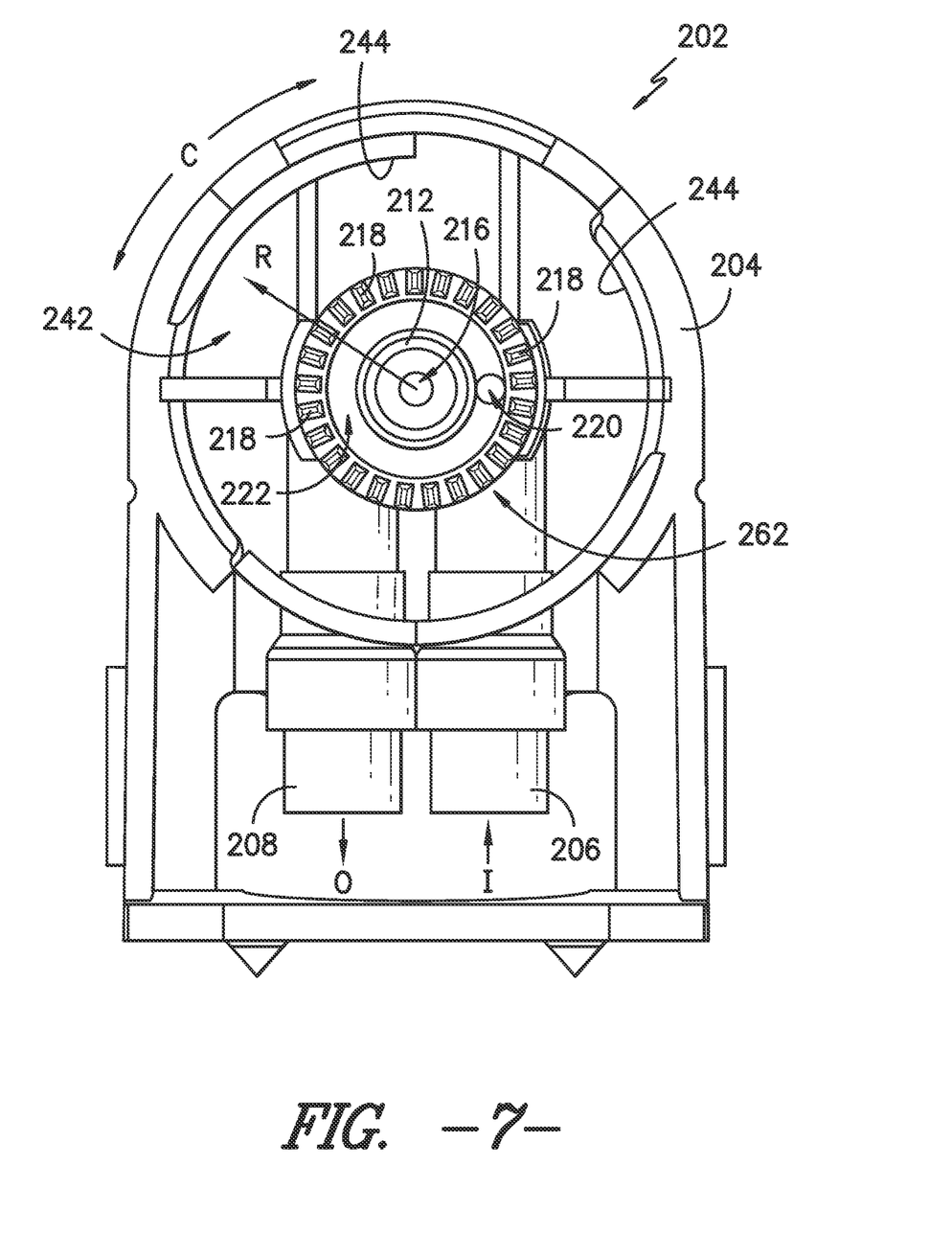
FIG. 7 is a bottom view of an exemplary filter manifold as provided with the exemplary fluid filter assembly of FIG. 3.

In this exemplary embodiment, filter manifold 202 includes a boss 212 that projects from filter manifold body 204 along an axial direction A (FIGS. 5 through 7). Boss 212 defines a fluid return port 216 that is in fluid connection with fluid outlet 208 whereby filtered fluid may be delivered from a filter cartridge 224 (FIG. 3) to fluid outlet 208. Boss 212 also defines a plurality of grooves 214 for the receipt of e.g., O-ring seals to ensure a fluid seal when boss 212 is received into filter cartridge 224 as will be further described. In other exemplary embodiments of the invention, the boss 212 may be located on filter cartridge 224 and a receiving port provided in filter manifold 202 for receipt of boss 212. In still other embodiments of the invention, filter assembly 200 may not include a boss as some other mechanism may be provided for connecting the flow of filtered fluid from cartridge 224 with filter manifold 202.

As part of the audible or sound generating features for this exemplary embodiment of the present invention, filter manifold 202 includes a plurality of teeth 218 positioned proximate to boss 212 (FIGS. 6 and 7). Teeth 218 are arranged in an adjacent manner along a row 262 that extends along circumferential direction C around boss 212—completely encircling boss 212 for this exemplary embodiment. Teeth 218 project along axial direction A and outwardly from filter manifold 202.

As shown in FIG. 7, a fluid delivery port 220 is also positioned proximate to boss 212. Fluid delivery port 220 is in fluid connection with fluid inlet 206 so as to provide unfiltered fluid into filter cartridge 224. For this exemplary embodiment, fluid delivery port 220 is positioned radially inward (see radial direction R in FIGS. 6 and 7) of the row 262 of teeth 218.

Figure 3:
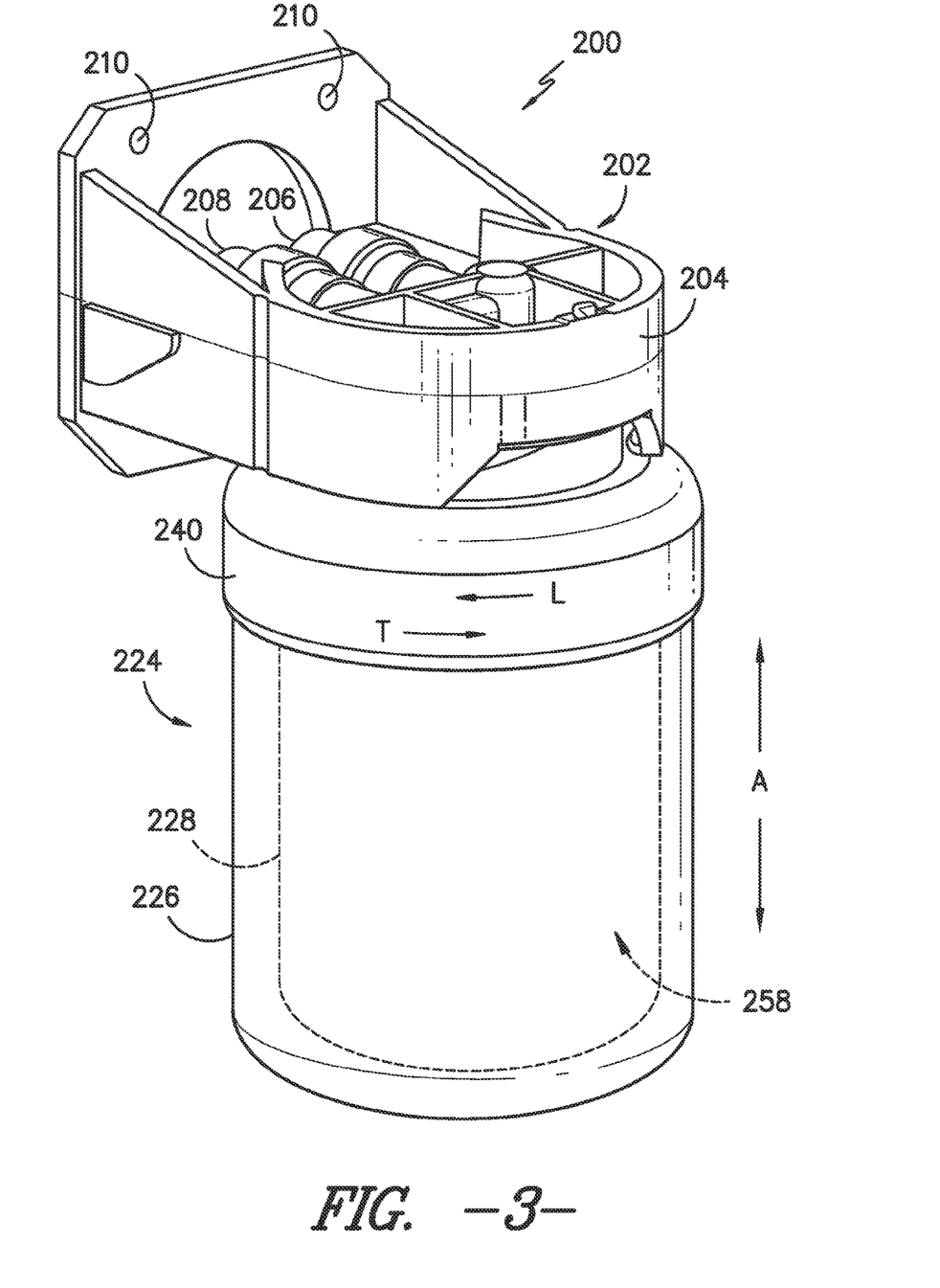
FIG. 3 is a perspective view of an exemplary embodiment of a fluid filter assembly of the present invention.
Figure 4:
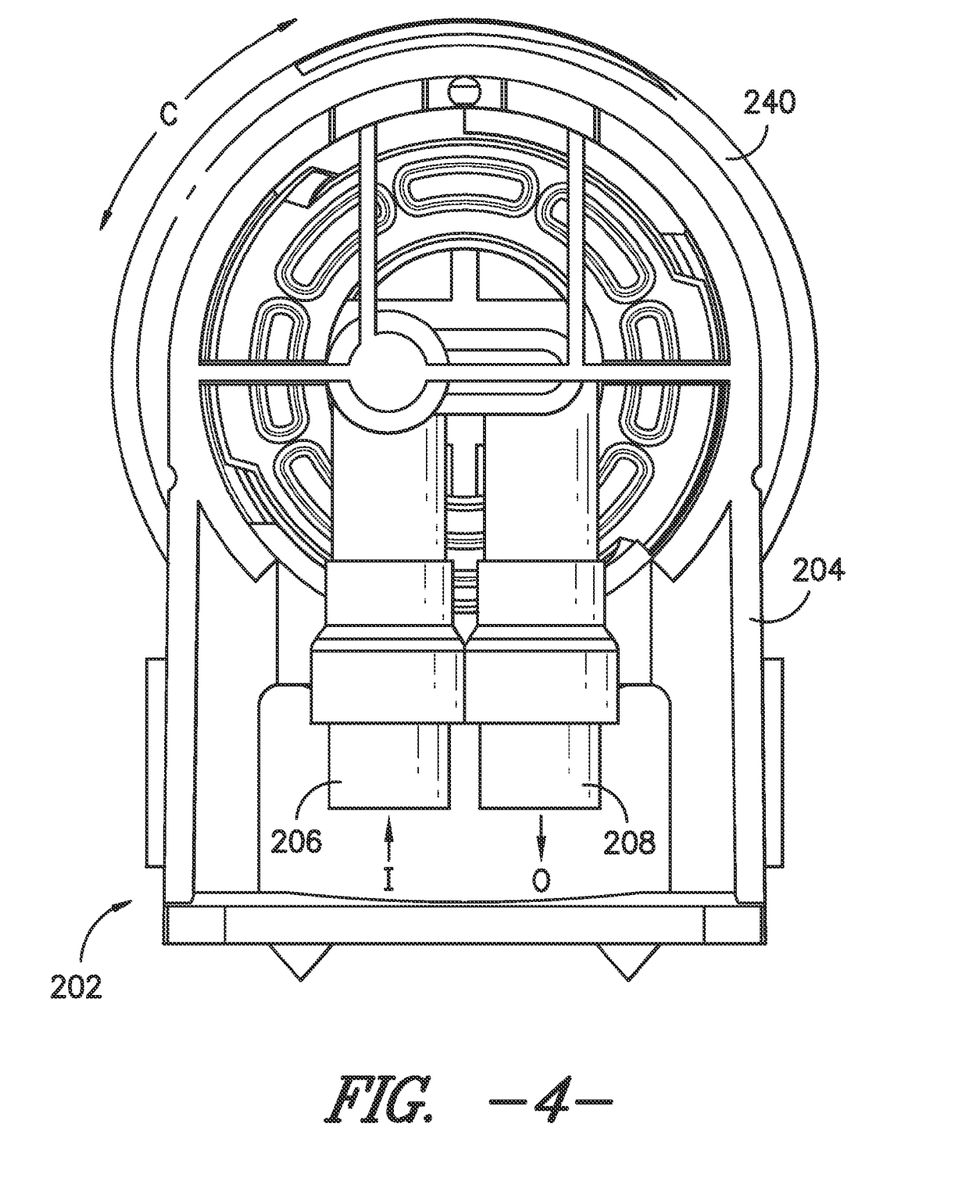
FIG. 4 provides a top view of the exemplary fluid filter assembly of FIG. 3.
Figure 11:
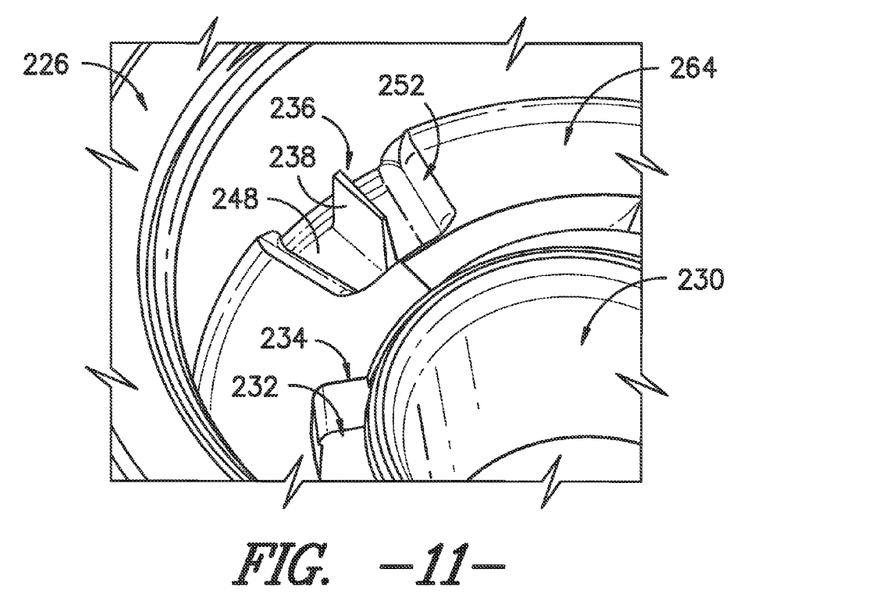
FIG. 11 is a partial perspective and top view of the exemplary filter top of FIGS. 8 and 9.

Filter manifold 202 also includes a groove 222 that extends circumferentially around boss 212. Fluid delivery port 220 is positioned within groove 222. When filter cartridge 224 is installed into filter manifold 202 as shown in FIG. 3, groove 222 is located adjacent to a receiving surface 264 (FIGS. 8 and 11) on filter top 240 and provides for a flow of fluid from fluid delivery port 220 to be distributed over receiving surface 264 and into filter cartridge 224. As such, groove 222 is useful for preventing or minimizing clogs that may be caused by particulates or other matter in the unfiltered fluid provided through fluid inlet 206. Alternatively, or in addition thereto, a similar groove can also be located on receiving surface 264.

As shown in FIG. 1, for this exemplary embodiment, filter cartridge 224 includes a filter housing 226 defining a chamber 258 into which a filter element 228 is received. Filter element 228 may be constructed from a variety of different types of filter media including textiles, resins, webs, and other components as well. Filtration with filtering element 228 may be based upon e.g., size exclusion, adsorption, and/or other mechanisms. While a variety of different constructions may be used, filter element 228 may be a cylindrically-shaped and configured so that fluid flows radially inward towards a center of filter element 228 as particulates or other matter are removed by the filter media.

Figure 8:
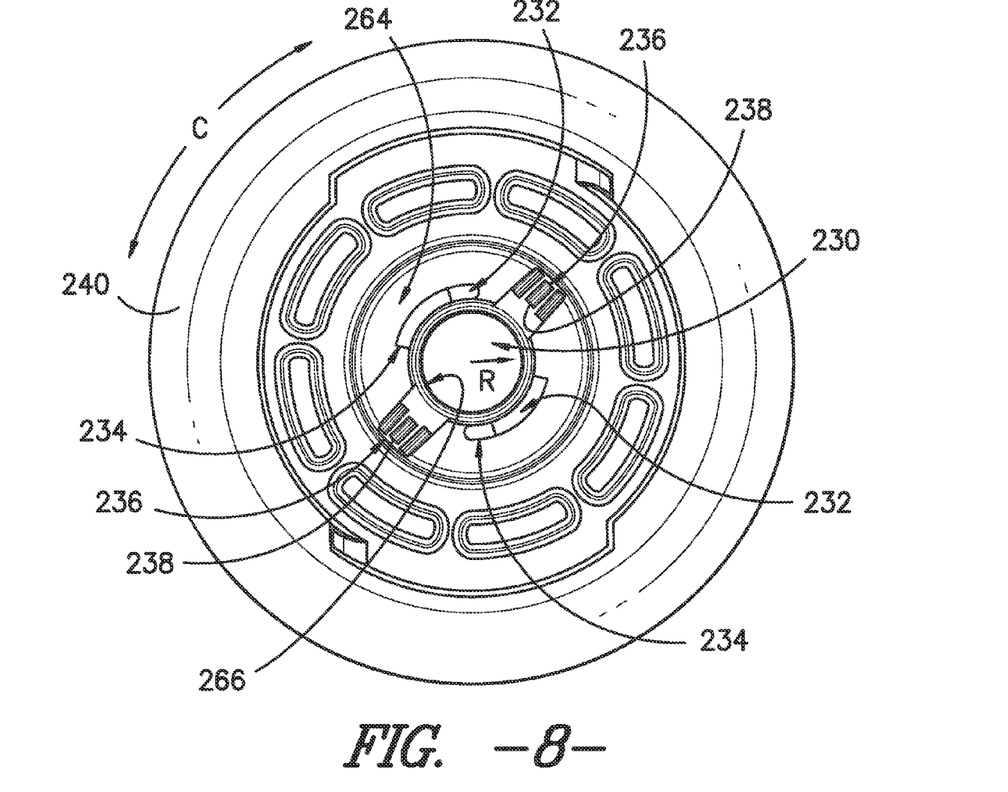
FIG. 8 is a top view of an exemplary filter cartridge as used with the exemplary fluid filter assembly of FIG. 3.
Figure 9:
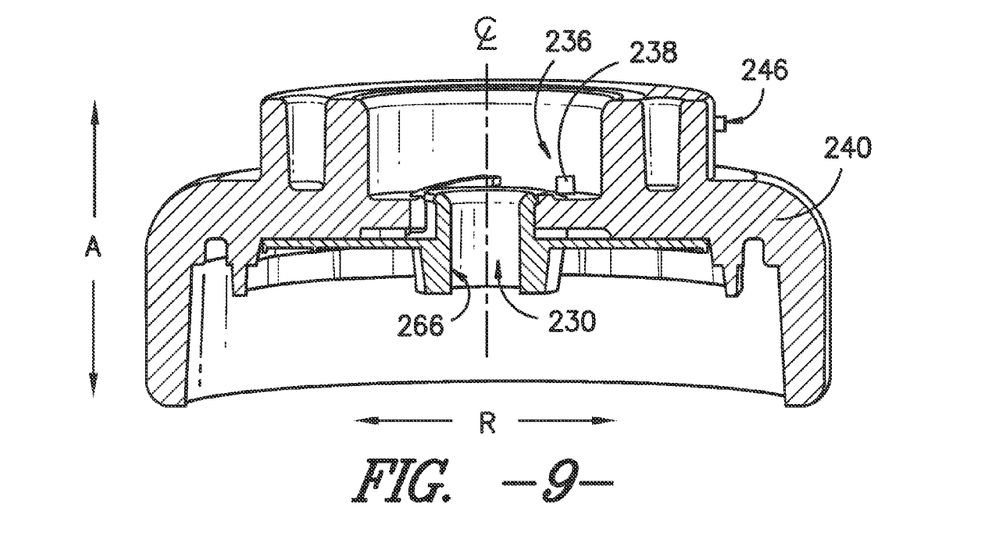
FIG. 9 provides a cross-section view of an exemplary filter top of the present invention as used with the exemplary fluid filter assembly of FIG. 3.
Figure 10:
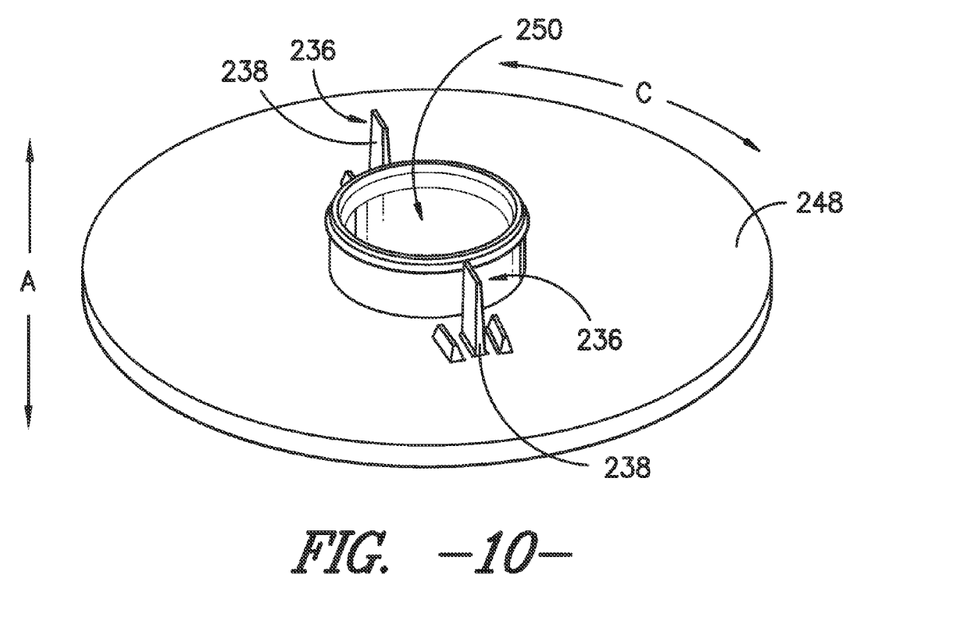
FIG. 10 provides a perspective view of an exemplary washer of the present invention as may be used with the exemplary fluid filter assembly of FIG. 3.

Turning to FIGS. 8 and 9, filter cartridge 224 includes a filter outlet 230 positioned along a centerline C/L of filter cartridge 224 and defined by a filter top 240. Filter outlet 230 receives boss 212 of filter manifold 202 and provides a surface 266 for sealing with e.g., O-rings in grooves 214 (FIG. 6). Once filter cartridge 224 is installed in filter manifold 202, fluid outlet 230 (FIGS. 8 and 9) is in fluid connection with the fluid return port 216 defined by boss 212 (FIG. 6).

Continuing with FIGS. 8 and 9, filter cartridge 224 also includes a fluid inlet 232 in the form of multiple openings 234 in filter top 240 that are in fluid connection with fluid delivery port 220 when filter cartridge 224 is properly installed. Accordingly, unfiltered fluid from fluid delivery port 220 may be delivered into chamber 258 for filtration by filter element 228. Although only two openings 234 are shown, multiple openings may be provided having shapes and locations different from that shown.

Referring now to FIGS. 8 through 12, filter cartridge 224 is also provided with a pair of actuators 236 that are positioned proximate to filter outlet 230 and serve as part of the audible or sound generating features of this exemplary embodiment. Each actuator of actuators 236 is constructed as a tine 238 made from a resilient (e.g., elastic) material that extends along axial direction A into contact with teeth 218 when filter cartridge 224 is installed into filter manifold 202. For this exemplary embodiment, actuators 236 are part of a washer 248 having an opening 250 that is positioned around filter outlet 230. Filter top 240 is positioned between washer 248 and filter manifold 202 when filter cartridge 224 is installed. As such, filter top 240 includes apertures 252 (FIG. 11) through which actuators 236 extend into contact with teeth 218.

As shown in FIGS. 3, 5, and 6, filter cartridge 224 is received into a recess 242 (FIG. 6) in filter manifold 202. Filter top 240 and filter manifold body 204 are provided with threads 244 and 246, respectively, for the removable connection of filter cartridge 224 to filter manifold 202. Threads 244 and 246 are provided by way of example only. Other mechanisms may be used for installation of filter cartridge 224.

Figure 12:
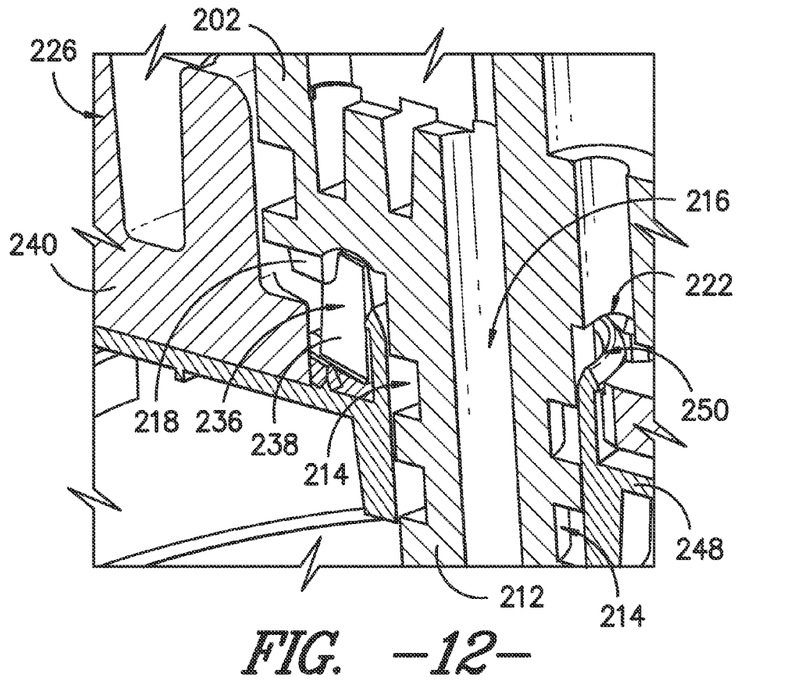
FIG. 12 is a partial cross-sectional view of a portion of the exemplary filter system of FIG. 3 with the cross-section located at the interface of the filter top, washer, and boss of the filter manifold.

During installation of filter cartridge 224 into recess 242 of filter manifold 202, filter cartridge 224 is rotated e.g., in the direction of arrow T (FIG. 3). Referring now to FIG. 12, as filter cartridge 224 is rotated and moved closer to filter manifold 202, eventually actuators 236 come into contact with teeth 218. The rotation of filter cartridge 224 causes actuators 236 to contact and pass over teeth 218 so as to emit a sound (e.g., clicks) that the user can hear as the filter cartridge is installed. Such sound confirms for the user that the filter cartridge 224 is being installed correctly. In addition, by controlling the spacing between teeth 218 and the relative profile of actuators 236, the number of e.g., clicks that result in proper seating and/or tightening of filter cartridge 224 into recess 242 can be controlled or predetermined. For example, the user can be instructed to listen for 2 or 3 clicks while rotating filter cartridge 224 to confirm that filter cartridge 224 is properly positioned and tightened. A different number of clicks or other sounds may be used as well.

As filter assembly 200 is in use, actuators 236 can also provide an audible signal to indicate that filter cartridge 224 is becoming uninstalled from recess 242. For example, water flowing from fluid delivery port 220 (FIG. 7) can cause filter assembly 200 to rotate in the direction of arrow L (FIG. 3) if filter cartridge 224 was not properly secured during installation. Again, this rotation can cause actuators 236 to pass over teeth 218 and provide an audible signal—e.g., clicks—notifying the user that the filter cartridge is not properly secured.

The present invention is not limited to a pair of actuators 236 positioned on opposing sides of filter outlet 230 as show in the figures. For example, a single actuator 236 or more than two actuators 236 may be used in other embodiments of the present invention. Actuators 236 may also be constructed in shapes different from the tines 238 shown in the figures provided such actuators 236 create a sound when passing in contact with teeth 218.

Figure 13:
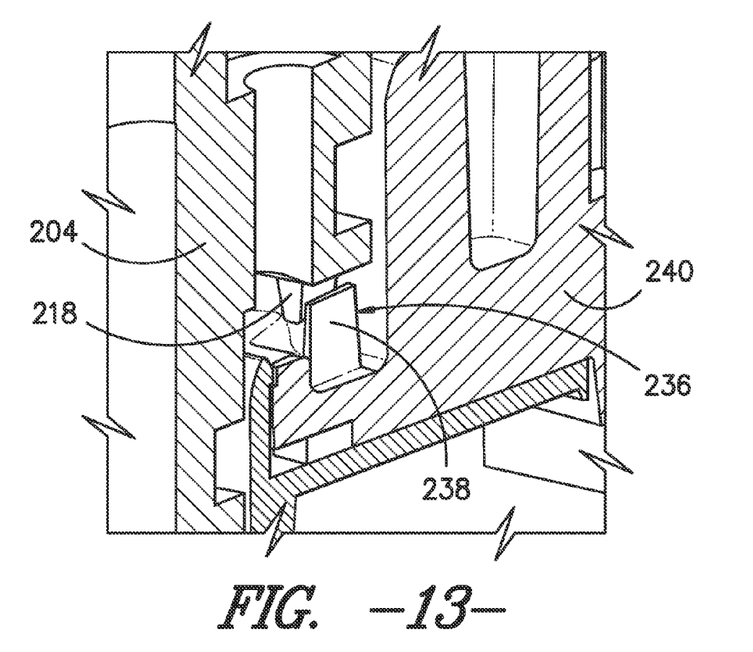
FIG. 13 is a partial cross-sectional view of a portion of another exemplary filter system embodiment with the cross-section located at the interface of the filter top and filter manifold.

Actuators 236 can also be supported upon elements of the filter cartridge other than washer 248. For example, referring to FIG. 13, actuators 236 can be configured as resilient tines 238 attached to the filter housing 226 or, more particularly, to filter top 240. Their operation would be as previously described with the embodiment of FIG. 12. Other locations and configurations for actuators 236 may be used as well.

Figure 14:
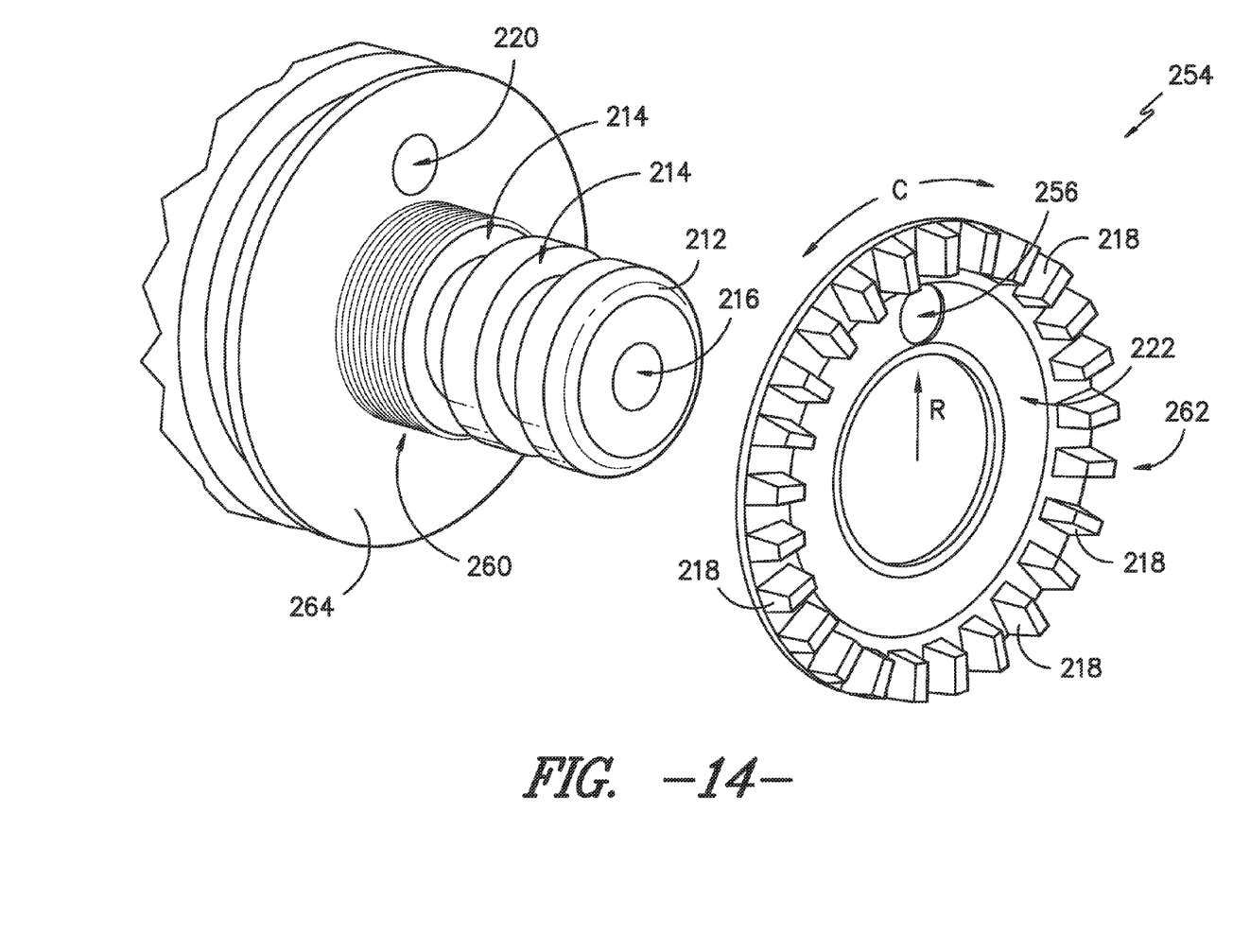
FIGS. 14 and 15 are perspective views of exemplary embodiments of a filter boss and teeth of the present invention.

Similarly, various embodiments and constructions may be used for teeth 218 around boss 212. For the embodiments of FIGS. 6 and 7, teeth 218 and groove 222 are e.g., formed integrally with filter manifold body 204. Referring now to FIG. 14, teeth 218 and groove 222 may also be defined by a ring 254 that is positioned around boss 212 and is attached to the filter manifold body 204 using threads 260. Alternatively, ring 254 may be glued, ultrasonically welded, and/or snap fit to filter manifold body 204. Other configurations may be used as well. An opening 256 is provided for alignment with fluid delivery port 220.

Figure 15:
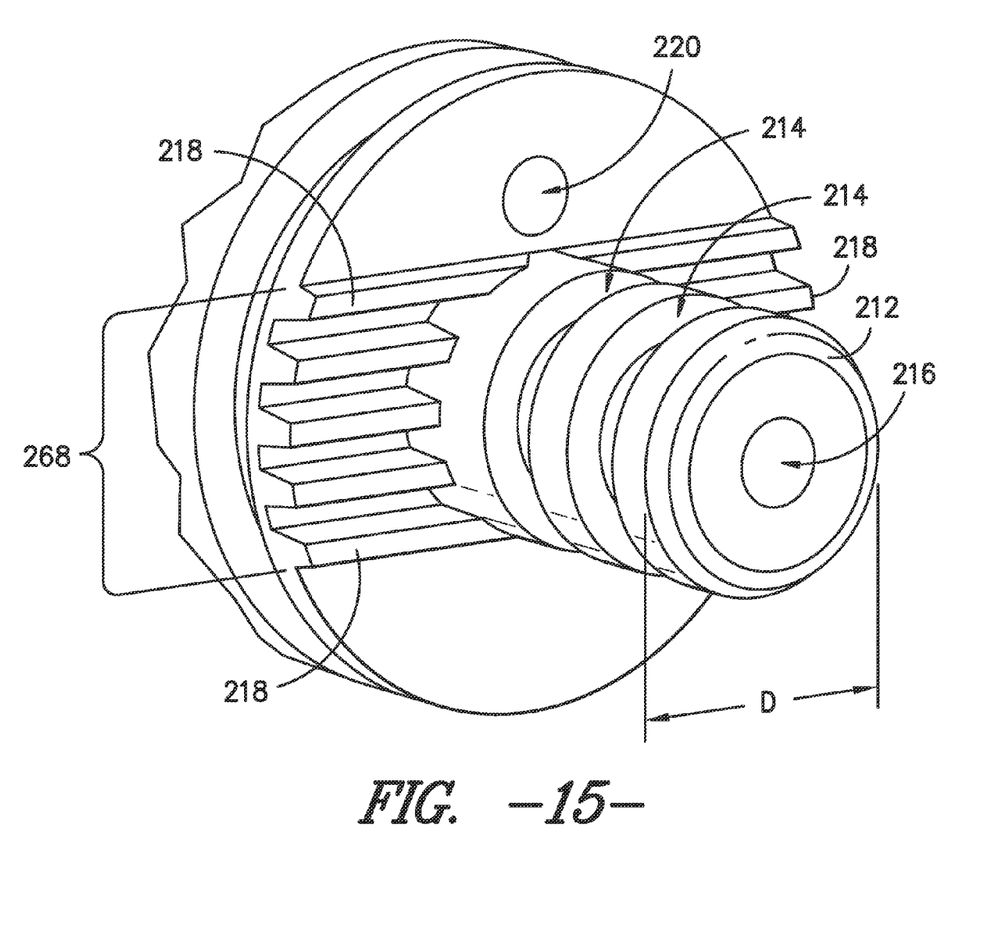

Another exemplary embodiment for filter manifold body 204 and teeth 218 is illustrated in FIG. 15. In this embodiment, teeth 218 are constructed in adjacent rows 268 that extend longitudinally in a manner parallel to each other and to diameter D of boss 212 as shown in FIG. 15. Teeth 218 operate as previously described to provide an audible signal when actuators 236 make passing contact therewith. Other shapes and configurations may be used for teeth 218 as well.

It should be understood that, in certain embodiments of the invention, actuators 236 and teeth 218 may provide a tactile signal as well as an audible signal. More particularly, during installation of the filter cartridge 224, the user may be able to feel the interaction of actuators 236 and teeth 218. While this is not required for every embodiment, the configuration of actuators 236 and teeth 218 can be designed to increase or decrease this tactile signal as will be understood by one of skill in the art using the teachings disclosed herein.

As previously set forth, the present invention is not limited to the use of threads 244 and 246 for the installation of filter cartridge 224 into filter manifold 202. In fact, filter assembly 200 may use other mechanisms (e.g., a latch device) whereby filter cartridge 224 is slid into place on filter manifold 202 and secured into position without rotation. For such embodiments, actuators 236 and teeth 218 could be configured for contact during a linear movement along the axial direction A. Other configurations may be used as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A fluid filter assembly, comprising:
 a filter manifold comprising
  a filter manifold body;
  a fluid inlet and a fluid outlet adapted for coupling the filter manifold to a fluid supply system;
  a fluid return port in fluid connection with the fluid outlet;
  a plurality of teeth positioned proximate to the fluid return port;
  a fluid delivery port positioned proximate to the fluid return port, the fluid delivery port in fluid connection with the fluid inlet;
 a filter cartridge removably attached to the filter manifold, the filter cartridge comprising
  a filter housing;
  a filter element received into the filter housing;
  a filter outlet for a flow of fluid from the filter element out of the filter housing and into the fluid return port;
  a filter inlet positioned proximate to the filter outlet and in fluid connection with the fluid delivery port of the filter manifold; and
  at least one actuator including a tine positioned adjacent to the filter outlet and extending into contact with at least one of the plurality of teeth during installation of the filter cartridge onto the filter manifold, the tine being resilient in an installation direction and a reverse uninstallation direction, the actuator configured for providing an audible signal as the filter cartridge is installed.

2. The fluid filter assembly of claim 1, wherein the filter manifold further comprises a groove extending circumferentially about the fluid return port.

3. The fluid filter assembly of claim 2, wherein the fluid delivery port is positioned in the groove that extends circumferentially about the fluid return port.

4. The fluid filter assembly of claim 1, wherein the filter manifold further comprises a boss projecting from the filter manifold body, the boss defining the fluid delivery port; and wherein the teeth of the plurality of teeth are arranged in a row that extends circumferentially about the boss.

5. The fluid filter assembly of claim 4, wherein the boss defines an axial direction along which the boss projects, and wherein the at least one actuator is connected with the filter housing and extends along the axial direction.

6. The fluid filter assembly of claim 1, wherein the filter manifold further comprises a boss projecting from the filter manifold body, the boss defining the fluid delivery port and defining a diameter, and wherein the plurality of teeth are arranged in rows that extend longitudinally in a manner that is parallel to the diameter of the boss.

7. The fluid filter assembly of claim 1, wherein the filter manifold body defines a recess into which the filter cartridge is removably received.

8. The fluid filter assembly of claim 1, wherein the at least one actuator is attached to the filter housing.

9. The fluid filter assembly of claim 1, wherein the filter cartridge further comprises:
a washer defining an opening positioned around the filter outlet, and wherein the at least one actuator is attached to the washer and extends from the washer towards the plurality of teeth of the filter manifold.

10. The fluid filter assembly of claim 9, wherein the filter housing defines a filter top that is positioned between the washer and the filter manifold, the filter top also defining at least one axial aperture through which the at least one actuator extends towards the plurality of teeth of the filter manifold.

11. The fluid filter assembly of claim 1, wherein the filter manifold further comprises:
a ring positioned around the fluid return port and attached to the filter manifold body, the ring defining the plurality of teeth positioned proximate to the fluid return port.

12. The fluid filter assembly of claim 11, wherein the ring also defines a groove that extends circumferentially about the fluid return port.

13. The fluid filter assembly of claim 1, wherein the tine is constructed from a resilient elastic material.

14. The fluid filter assembly of claim 1, wherein the at least one actuator comprises a pair of actuators positioned substantially in an opposing manner about the filter outlet.

15. A refrigerator appliance comprising the fluid filter assembly of claim 1.

16. A filter cartridge for a filter system, the filter cartridge comprising:
A filter element;
A filter housing defining a chamber into which the filter element is received, the filter housing having a filter outlet and a filter inlet in fluid communication with the chamber and configured so that fluid may pass through the filter element; and
At least one actuator including a tine positioned adjacent to the filter outlet, the actuator extending longitudinally away from the filter element, the tine being resilient in an installation direction and a reverse uninstallation direction, and the actuator configured to provide an audible signal during installation of the filter cartridge into the filter system.

17. The filter cartridge as in claim 16, wherein the at least one actuator is attached to the filter housing.

18. The filter cartridge as in claim 16, further comprising:
a washer defining an opening that is positioned around the filter outlet, wherein the at least one actuator is attached to the washer and extends away from the filter element.

19. The filter cartridge as in claim 18, wherein the filter housing defines a filter top that is positioned over the washer, the filter top also defining at least one aperture through which the at least one actuator extends.

* * * * *

UNITED STATES PATENT AND TRADEMARK OFFICE
CERTIFICATE OF CORRECTION

PATENT NO. : 9,687,764 B2  
APPLICATION NO. : 13/721198  
DATED : June 27, 2017  
INVENTOR(S) : Andrew Reinhard Krause Page 1 of 1

It is certified that error appears in the above-identified patent and that said Letters Patent is hereby corrected as shown below:

In the Claims

CLAIM 16: In Line 17 of Column 10, "A filter element" should be "a filter element"  
CLAIM 16: In Line 18 of Column 10, "A filter housing" should be "a filter housing"  
CLAIM 16: In Line 24 of Column 10, "At least one actuator" should be "at least one actuator"

Signed and Sealed this  
Nineteenth Day of June, 2018

Andrei Iancu  
*Director of the United States Patent and Trademark Office*